US006909939B1

(12) United States Patent
Yamada (10) Patent No.: US 6,909,939 B1
(45) Date of Patent: Jun. 21, 2005

(54) NUMERICAL CONTROL METHOD AND NUMERICAL CONTROL DEVICE

(75) Inventor: Yoshinori Yamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 229 days.

(21) Appl. No.: 10/258,850

(22) PCT Filed: Sep. 20, 2000

(86) PCT No.: PCT/JP00/06422

§ 371 (c)(1),
(2), (4) Date: Oct. 29, 2002

(87) PCT Pub. No.: WO02/27417

PCT Pub. Date: Apr. 4, 2002

(51) Int. Cl.[7] .............................................. G06F 19/00
(52) U.S. Cl. ...................................... 700/189; 700/194
(58) Field of Search .................. 700/95, 114, 159–161, 700/170, 178–182, 186, 189, 194

(56) References Cited

U.S. PATENT DOCUMENTS

| | | | | |
|---|---|---|---|---|
| 4,789,931 A | * | 12/1988 | Kuragano et al. .......... 700/176 |
| 4,954,762 A | * | 9/1990 | Miyake et al. ......... 318/568.19 |
| 5,117,169 A | * | 5/1992 | Kakino et al. .............. 318/578 |
| 5,134,570 A | * | 7/1992 | Nankaku .................... 700/193 |
| 5,282,144 A | * | 1/1994 | Kawamura et al. ......... 700/189 |
| 5,369,592 A | * | 11/1994 | Honda ........................ 700/187 |
| 5,373,220 A | | 12/1994 | Tomoguchi |
| 5,583,409 A | * | 12/1996 | Kurakake et al. ........... 318/569 |
| 5,798,947 A | * | 8/1998 | Ye et al. ....................... 702/95 |
| 5,808,888 A | * | 9/1998 | Susnjara et al. .............. 700/86 |
| 5,885,199 A | * | 3/1999 | Shao ............................ 483/19 |
| 6,022,132 A | * | 2/2000 | Schulz ........................ 700/186 |
| 6,298,531 B1 | * | 10/2001 | Baumbusch et al. ........... 29/40 |
| 6,430,476 B1 | * | 8/2002 | Schwaar et al. ............ 700/251 |

FOREIGN PATENT DOCUMENTS

| | | | | |
|---|---|---|---|---|
| JP | 62-282863 A | * | 12/1987 |
| JP | 2-232142 A | | 9/1990 |
| JP | 04-157505 A | * | 5/1992 |
| JP | 05-341823 A | * | 12/1993 |
| JP | 07-044215 A | * | 2/1995 |
| JP | 07-261815 A | * | 10/1995 |
| JP | 2000-084780 A | * | 3/2000 |

* cited by examiner

Primary Examiner—Maria N. Von Buhr
(74) Attorney, Agent, or Firm—Sughrue Mion, PLLC (57) ABSTRACT

Two shafts whose moving directions do not intersect orthogonally with each other are set, then any one shaft of two shafts as an oblique reference shaft is set, then information based on an angle between two shafts whose moving directions do not intersect orthogonally with each other are set, then a first program orthogonal coordinate system constructed such that a moving direction of the oblique reference shaft coincides with a command axis direction of the program orthogonal coordinate system and a second program orthogonal coordinate system constructed such that a moving direction of another shaft other than the oblique reference shaft coincides with a command axis direction of the program orthogonal coordinate system are set, and then any one of the first program orthogonal coordinate system and the second program orthogonal coordinate system is selected. Accordingly, the optimum tool can be selected to meet to the process pattern and the process can be executed by the optimum shaft feed, and thus the processing precision can be improved.

9 Claims, 10 Drawing Sheets

NUMERICAL CONTROL METHOD AND NUMERICAL CONTROL DEVICE

TECHNICAL FIELD

The present invention relates to a numerical control method and system (referred to as an "NC system" hereinafter) for controlling a machine tool, etc. having feed shafts that do not intersect orthogonally with each other and, more particularly, the coordinate system control for executing the control by converting the command axis of the NC program, that is commanded on the orthogonal coordinate system, into a command position on the shaft to coincide with the moving direction of the feed shaft that is fitted to the machine.

BACKGROUND ART

Figure 10:
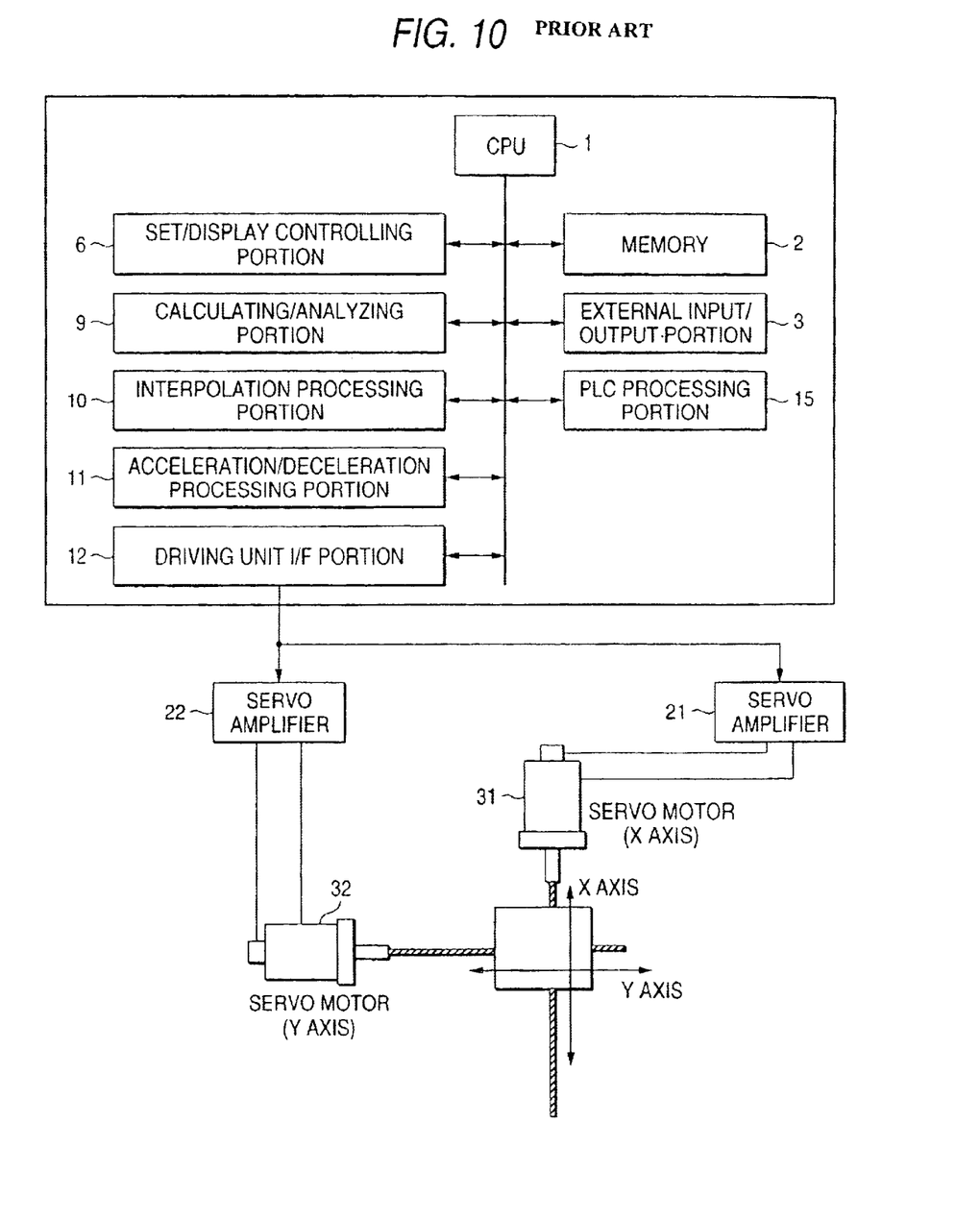
FIG. 10 is a block diagram showing the pertinent portion of the numerical control system in the prior art.

FIG. 10 is a block diagram showing the pertinent portion of the numerical control system in the prior art. In FIG. 10, 1 is a CPU, 2 is a memory, 3 is an external input/output portion, 6 is a set/display controlling portion, 9 is a calculating/analyzing portion, 10 is an interpolation processing portion, 11 is an acceleration/deceleration processing portion, 12 is a driving unit 1/F portion, 15 is a PLC processing portion, and 21, 22 are servo amplifiers that drive/control servo motors 31, 32 to positions in compliance with the command pulse generated by the NC system and also move the axes to commanded positions.

As is well known, the NC system analyzes the NC program loaded in the memory 2 or the like, then generates moving command pulses indicating the command positions on respective axes, and then drives the tool, etc. Normally, the command pulse being issued to the servo amplifiers has the unit of a physical length, for example, one pulse has 0.1 $\mu$m. With regard to the feed on the NC program being commanded on the orthogonal coordinate system, the interpolation pulses are generated to the driving units, which feed the shafts in commanded axis directions, in response to an amount of feed respectively.

Also, as disclosed in Patent Application Publication (KOKAI) Hei 5-341823, there is the case that, for the purpose of size reduction of the machine, etc., in some case the feed shaft for driving the tool slide, or the like is arranged to be inclined by an angle other than 90°. Such an oblique shaft control technology is present that command pulse is output in response to the NC program, which issues the command on the orthogonal coordinate system, in terms of an amount of feed in the shaft direction that is obliquely arranged and then the tool slide, or the like is moved in the commanded axis direction on the orthogonal coordinate system that is commanded by the NC program.

Figure 11:
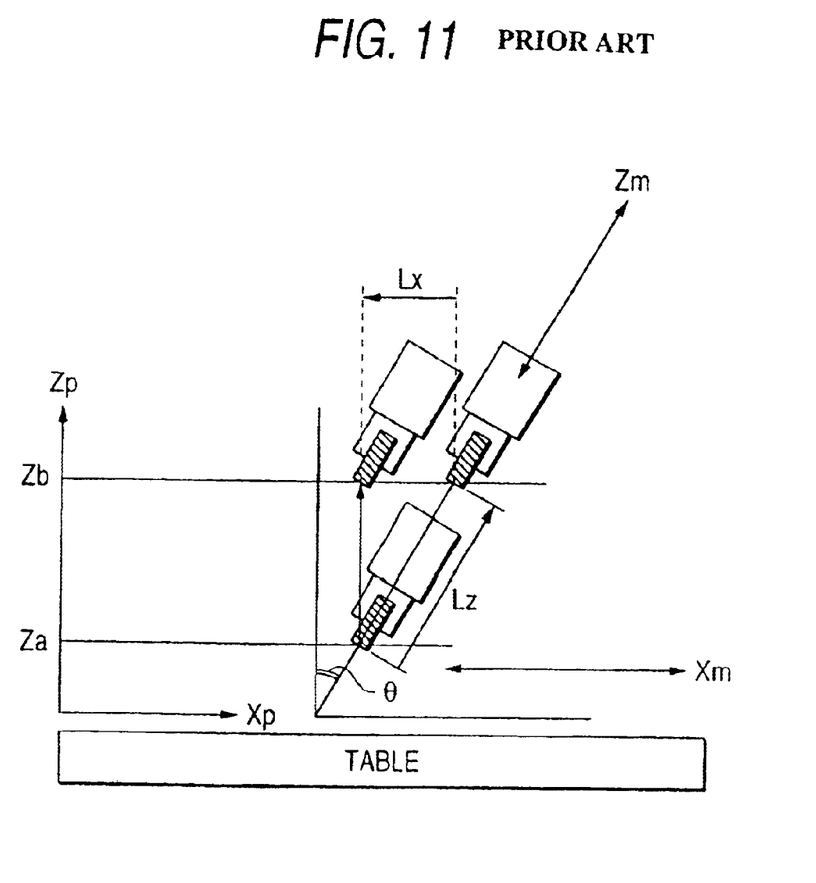
FIG. 11 is a view explaining the oblique axis control of the numerical control system in the prior art.

FIG. 11 is an example of the oblique shaft control. The NC program issues the command on the orthogonal coordinate system Xp-Zp, but the moving directions of the actually provided shafts are the Xm-axis direction and the Zm-axis direction. The Zm-axis direction is arranged at an inclination to the Zp-axis direction by an angle $\theta$. If the moving command from Za to Zb is issued by the program command, the NC system generates the command pulse indicating the amount of movement Lz to the Zm-axis servo control portion. At this time, since the tool position is displaced in the Xp-axis direction, the command pulse indicating the amount of movement of the length Lx is generated to the Xm-axis servo control portion at the same time to correct the displacement of the nose in the Xp-axis direction. The moving command pulses at this time are calculated by $$Lz=(Zb-Za)*(1/\cos \theta)$$

$$Lx=Lz*\sin \theta.$$

In the above NC system in the prior art, in the case that the feed shaft direction along which the command pulse is actually output is different from the command axis direction that is commanded by the NC program on the orthogonal coordinate system, for example, in the example shown in FIG. 11, the actual feed shaft (Zm axis) direction is inclined from the feed in the Zp-axis direction by an angle $\theta$ with respect to the command on the orthogonal coordinate system Xp-Zp. Therefore, the actual feed is given as a synthesized feed of the movement in the Xm-axis direction and the movement in the Zm-axis direction in response to the command in the Zp-axis direction.

Accordingly, in the case that the conventional NC system controls the machine tool, etc. having the feed shafts such that the Zm axis is inclined to the Xm axis by an angle $\theta$, it is impossible to issue the moving command on the Zm axis (the feed shaft that is inclined to the Xm axis by the angle $\theta$) only in response to the feed command on the orthogonal coordinate system.

That is, there is such a problem that only the Zm axis cannot be operated not to cause the operation of the Xm axis.

In this connection, in the case of the above machine, if only the Zm axis cannot be operated without the operation of the Xm axis, it is impossible to carry out the process during which a movement of the feed shaft must be controlled in synchronism with the rotation of the spindle), etc., for example, the tapping process in the Zm-axis direction (this process is carried out by fitting the tapping tool to the rotated spindle and then feeding this spindle in the Zm axis direction in synchronism with the rotation of the spindle).

In light of the above disadvantageous point, it may be considered theoretically that the program orthogonal coordinate system should be set to not the orthogonal coordinate system but the coordinate system whose axes coincide with the Zm axis and the Xm axis. However, normally the machining plan is set forth by the third angle projection method. Therefore, as described above, if the program orthogonal coordinate system is set to not the orthogonal coordinate system but the coordinate system whose axes totally coincide with the feed shaft directions of the machine, there is often caused the case that the data set forth in the machining plan cannot be employed as they are in preparing the program. Thus, there are disadvantages that the command values must be calculated based on the data set forth in the machining plan, and thus such coordinate system is not practical.

DISCLOSURE OF THE INVENTION

The present invention has been made to overcome the above problems, and it is an object of the present invention to provide a numerical control method and system in which one shaft can be moved not to cause the movement of the other shaft even when a machine tool or the like having feed shafts, which do not intersect orthogonally with each other, are controlled.

Then, a numerical control method according to the present invention of controlling a machine tool having at least two feed shafts, moving directions of which do not intersect orthogonally with each other, or the like by issuing commands on a program orthogonal coordinate system, comprises a step of setting two shafts whose moving directions do not intersect orthogonally with each other, setting any one shaft of two shafts as an oblique reference shaft, setting information based on an angle between two shafts whose moving directions do not intersect orthogonally with each other, and setting a first program orthogonal coordinate system constructed such that a moving direction of the oblique reference shaft coincides with a command axis direction of the program orthogonal coordinate system and a second program orthogonal coordinate system constructed such that a moving direction of another shaft other than the oblique reference shaft coincides with a command axis direction of the program orthogonal coordinate system; and a step of selecting any one of the first program orthogonal coordinate system and the second program orthogonal coordinate system.

Also, a numerical control system according to the present invention for controlling a machine tool having at least two feed shafts, moving directions of which do not intersect orthogonally with each other, or the like by issuing commands on a program orthogonal coordinate system, comprises first setting means for setting two shafts whose moving directions do not intersect orthogonally with each other, and setting any one shaft of two shafts as an oblique reference shaft; oblique angle setting means for setting information based on an angle between two shafts whose moving directions do not intersect orthogonally with each other; and coordinate system selecting means for selecting any one of a first program orthogonal coordinate system constructed such that a moving direction of the oblique reference shaft coincides with a command axis direction of the program orthogonal coordinate system and a second program orthogonal coordinate system constructed such that a moving direction of another shaft other than the oblique reference shaft coincides with a command axis direction of the program orthogonal coordinate system, both being set by the first setting means and the oblique angle setting means.

Therefore, the optimum tool can be selected to meet to the process pattern, and the process can be executed by the optimum shaft feed, and thus the processing precision can be improved.

Also, the numerical control system according to the present invention further comprises initial coordinate system setting means for selecting any one of the first program orthogonal coordinate system and the second program orthogonal coordinate system as the program orthogonal coordinate system in an initial state.

Therefore, the program orthogonal coordinate system can be selected without the issuance of the coordinate system selecting command to conform to the tool that is selected initially according to the process pattern, and thus there can be achieved the effect that the program length can be saved.

Also, in the numerical control system according to the present invention, the oblique angle setting means sets directly a length ratio of three sides of a triangle based on an angle between two shafts whose moving directions do not intersect orthogonally with each other.

Therefore, not only the values of the oblique ratios can be set easily based on the fitting dimension of the machine, but also the command value on the orthogonal coordinate system can be converted into the command value on the actual shaft by four operations only without the complicated computation such as the trigonometric function. As a result, the computing load can be reduced and thus there can be achieved the effect that the performance of the NC system can be improved.

Also, in the numerical control system according to the present invention, the oblique angle setting means calculates a length ratio of three sides of a triangle based on an angle between two input shafts whose moving directions do not intersect orthogonally with each other and then sets a calculated length ratio of three sides of the triangle.

Therefore, it is required of the operator to set merely the oblique angle, and thus the time and labor in setting can be omitted.

Also, the calculated length ratio of three sides of the triangle can be set in the inside of the NC system. Therefore, the command value on the orthogonal coordinate system can be converted into the command value on the actual shaft by the four operations only. As a result, the computing load can be reduced and thus there can be achieved the effect that the performance of the NC system can be improved.

BEST MODE FOR CARRYING OUT THE INVENTION

First Embodiment

An first embodiment of the present invention will be explained with reference to FIG. 1 to FIG. 9 hereinafter.

In this case, this first embodiment shows an example when the NC system according to the present invention is applied the NC lathe.

Figure 1:
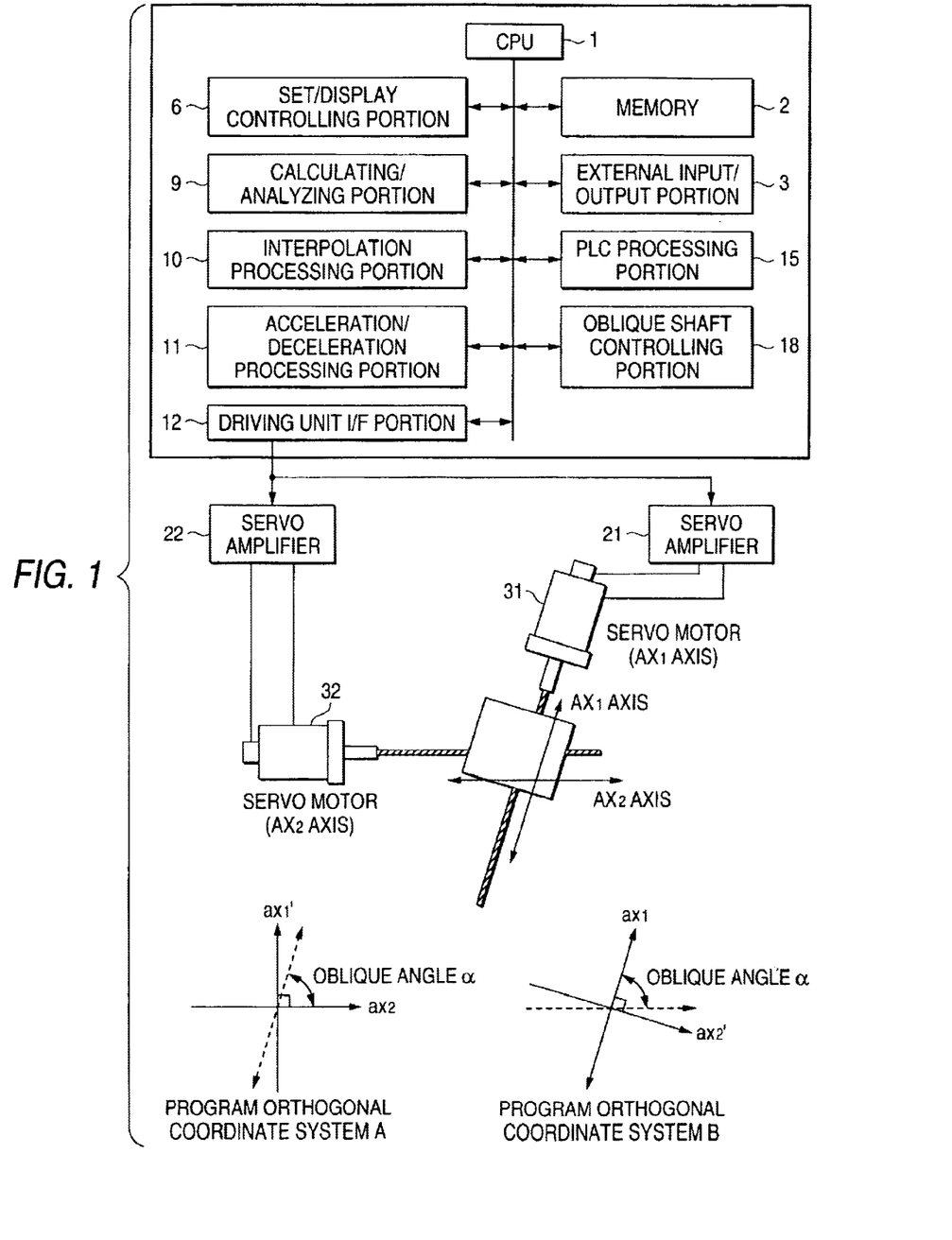
FIG. 1 is a view showing a configuration of a numerical control system according to an first embodiment of the present invention and a program orthogonal coordinate system.

FIG. 1 is a block diagram showing a configuration of the NC system according to an first embodiment of the present invention. Here, 1 is a CPU, 2 is a memory, 3 is an external input/output portion, 6 is a set/display controlling portion, 9 is a calculating/analyzing portion, 10 is an interpolation processing portion, 11 is an acceleration/deceleration processing portion, 12 is a driving unit I/F portion, 15 is a PLC processing portion, and 18 is an oblique shaft controlling portion. Their details will be described later with reference to FIG. 2 to FIG. 7. Also, 21, 22 are servo amplifiers, and 31, 32 are servo motors. A feed shaft Ax1 axis that is tilted by a predetermined angle to a feed shaft Ax2 axis is driven by the servo motor 31, and the feed shaft Ax2 axis is driven by the servo motor 32.

Figure 8:
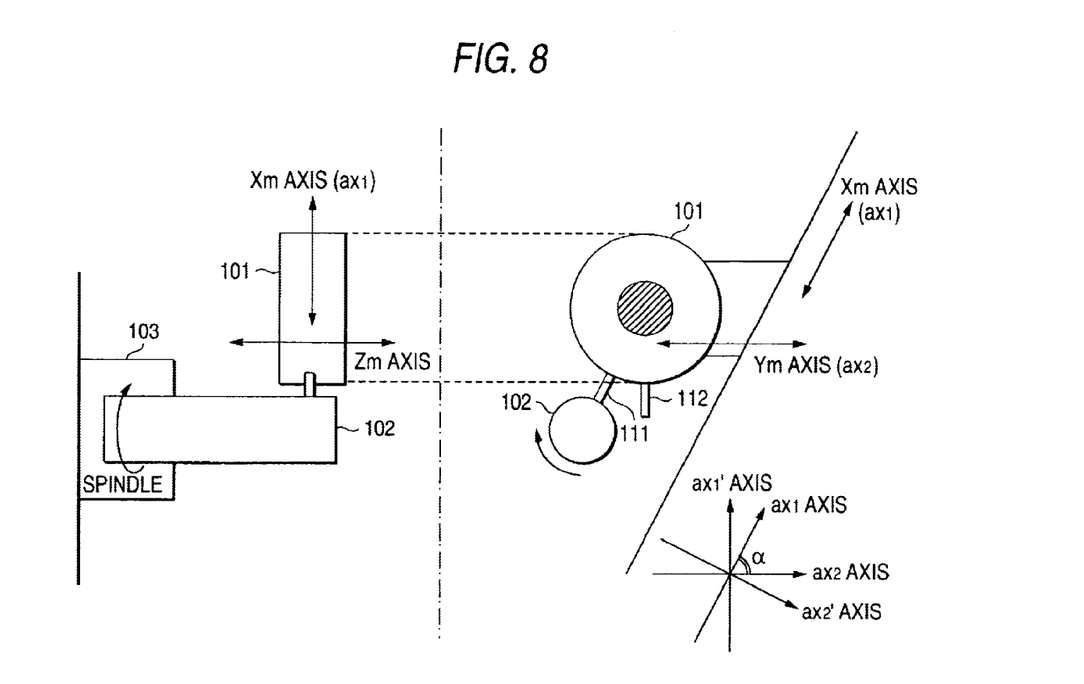
FIG. 8 is a schematic configurative view of an NC machine tool that is controlled by the numerical control system according to the first embodiment of the present invention.

The numerical control system according to the present embodiment is applied to the NC lathe shown in FIG. 8, for example. This system has an orthogonal coordinate system ax1'–ax2 in which an axis direction of the feed shaft Ax2 is constructed to coincide with an ax2 axis direction of a program orthogonal coordinate system (program orthogonal coordinate system A) and an orthogonal coordinate system ax1–ax2' in which an axis direction of the feed shaft Ax1 is constructed to coincide with an ax1 axis direction of the program orthogonal coordinate system (program orthogonal coordinate system B), and carries out the optimum process by selecting the above program coordinate system arbitrarily in response to the machining patterns.

In this case, the NC lathe shown in FIG. 8 is constructed as follows. That is, a turret 101 to which a tool-1 111 for the turning process or the tapping process and a tool-2 112 for the milling process, etc. are fitted is driven by the Xm axis (which corresponds to the feed shaft Ax1 in FIG. 1, and the feed direction coincides with the ax1-axis direction of the program orthogonal coordinate system B), the Ym axis (which corresponds to the feed shaft Ax2 in FIG. 1, and the feed direction coincides with the ax2-axis direction of the program orthogonal coordinate system A), and the Zm axis. Also, the Xm axis is arranged to be driven at an inclination to the Ym axis by an angle α, and the Ym axis is arranged to be driven in the horizontal direction. Also, the Zm axis is arranged to be driven in the horizontal direction and the work longitudinal direction. In addition, a work 102 held by a chuck 103 is rotated by the spindle and is processed by the tool fitted to the turret 101 by driving the Xm axis, the Ym axis, and the Zm axis.

The NC lathe shown in FIG. 8 is constructed as above. If the program orthogonal coordinate system B (the program orthogonal coordinate system whose axis does not coincide with the Ym axis but coincides with the Xm axis) is selected, then the tapping tool that is rotated by a motor (not shown) being built in the turret 101 is selected as the tool-1 111, and then the command for moving only the Xm axis is issued, only the Xm axis is moved without the movement of the Ym axis and thus the tapping process can be applied to the work 102.

Also, if the program orthogonal coordinate system A (the program orthogonal coordinate system whose axis does not coincide with the Xm axis but coincides with the Ym axis) is selected, then the milling tool is selected as the tool-2 112, and then the command for moving only the Ym axis is issued, only the Ym axis is moved without the movement of the Xm axis and thus the milling process can be applied to the work 102.

The numerical control system according to the present embodiment has functions as mentioned above. Their details will be explained in the following.

Figure 2:
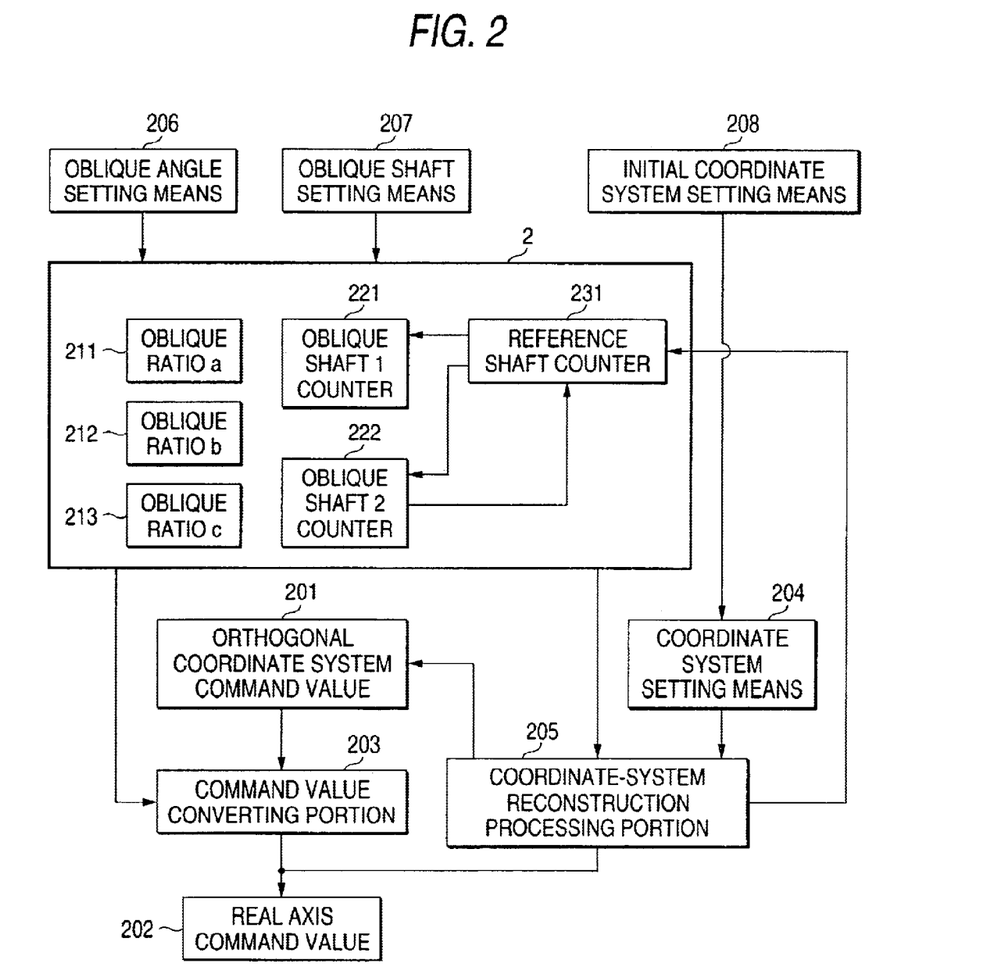
FIG. 2 is a block diagram showing an oblique shaft controlling portion in the numerical control system according to the first embodiment of the present invention.

FIG. 2 is a block diagram showing processes according to the oblique shaft controlling portion 1B. In FIG. 2, 201 is an orthogonal coordinate system command value commanded by the NC program, 202 is a real axis command value as the command value for driving the actual feed shafts (the feed shaft Ax1, the feed shaft Ax2 shown in FIG. 1), and 203 is a command value converting portion for executing the coordinate transformation from the orthogonal coordinate system command value 201 to the real axis command value 202. Their details will be described later with reference to FIG. 4 and FIG. 5. Also, 204 is coordinate system selecting means for selecting the coordinate system commanded by the NC program or initial coordinate system setting means 208. This selecting means selects any one of the program orthogonal coordinate system A (the coordinate system in which the ax1' axis does not coincide with the axis direction of the feed shaft Ax1 of the actual machine, but the ax2 axis coincides with the feed shaft Ax2 of the actual machine) shown in FIG. 1 and the program orthogonal coordinate system B (the coordinate system in which the ax2' axis does not coincide with the axis direction of the feed shaft Ax2 of the actual machine, but the ax1 axis coincides with the feed shaft Ax1 of the actual machine) shown in FIG. 1. Also, 205 is a coordinate-system reconstruction processing portion for executing a re-computing process based on the real axis command value to get a current position on the newly selected orthogonal coordinate system when another orthogonal coordinate system is selected by the coordinate system selecting means 204. Its detail will be described later with reference to FIG. 6 and FIG. 7. Also, 206 is oblique angle setting means for storing ratios a, b, c of respective sides (referred to as "oblique ratios" hereinafter) of a triangle having an oblique angle α (an inclination angle of the feed shaft Ax1 to the feed shaft Ax2), which is input from the keyboard, or the like, in oblique ratio memories 211 to 213. Its detail will be described later with reference to FIG. 3. Also, 207 is oblique shaft setting means that sets shaft numbers of mutually-inclined shafts (the feed shaft Ax1, the feed shaft Ax2 shown in FIG. 1) in an oblique shaft 1 counter 221 and an oblique shaft 2 counter 222. At this time, the shaft being set in the oblique shaft 2 counter 222 (the feed shaft Ax2) is identified as an oblique reference shaft (the feed shaft that coincides with the axis direction of the program orthogonal coordinate system) in the NC system, and the data are set in a reference shaft counter 231. Also, 208 is the initial coordinate system setting means for converting the default program orthogonal coordinate system into the initial program orthogonal coordinate system in the start of the NC system when the user sets the parameters via the parameter setting screen of the NC system as the case may be, and then inputting such coordinate system into the coordinate system selecting means 204. For example, such initial coordinate system setting means converts the coordinate system into the program orthogonal coordinate system B if the default program orthogonal coordinate system is the program orthogonal coordinate system A (in the case of the present embodiment), and converts the coordinate system into the program orthogonal coordinate system A if the default program orthogonal coordinate system is the program orthogonal coordinate system B, whereby the converted program orthogonal coordinate system is set as the initial program orthogonal coordinate system.

Figure 3:
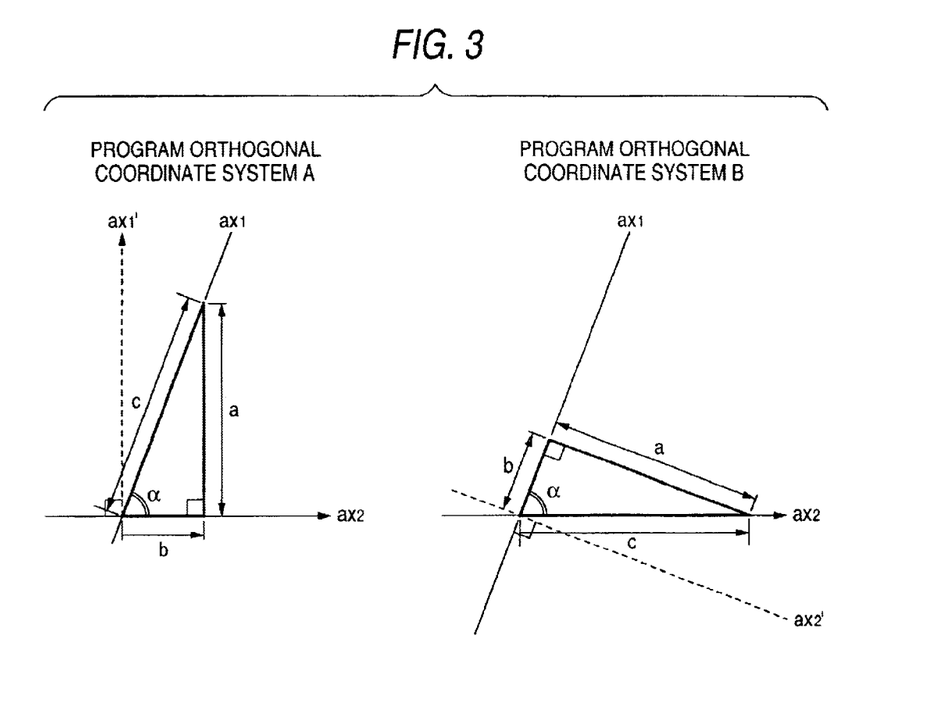
FIG. 3 is a view explaining how to set oblique ratios in the numerical control system according to the first embodiment of the present invention.

FIG. 3 is an explanatory view concerning to the setting of oblique ratios of obliquely-set shafts by the oblique angle setting means 206.

As shown in FIG. 3, if the feed shaft Ax1 and the feed shaft Ax2 are set to have the oblique angle α, such feed shaft Ax1 and such feed shaft Ax2 are set in the oblique shaft 1 counter 221 and the oblique shaft 2 counter 222 as the oblique shaft 1 and the oblique shaft 2 by the oblique shaft setting means 207. At this time, in the present embodiment, since the shaft being set in the oblique shaft 2 counter 222 in the NC system is identified as the oblique reference shaft and also the data are set in the reference shaft counter 231, the feed shaft Ax2 is treated as the oblique reference shaft until the content of the reference shaft counter 231 is changed by the coordinate-system reconstruction processing portion 205. At this time, the program orthogonal coordinate system A is selected as the initial coordinate system, and this program orthogonal coordinate system A provides the default values. In contrast, if it is desired to set the program orthogonal coordinate system B as the initial coordinate system, such program orthogonal coordinate system B is set by the initial coordinate system setting means 208.

If the shaft being set in the oblique shaft 1 counter 221 in the NC system should be identified as the oblique reference shaft, the program orthogonal coordinate system B is selected as the initial coordinate system and this program orthogonal coordinate system B provides the default values. In this case, it is also desired to set the program orthogonal coordinate system A as the initial coordinate system, such program orthogonal coordinate system A is set by the initial coordinate system setting means 208.

Also, ratios of respective sides of a right triangle, which consists of respective sides in the ax1-axis direction, the ax2-axis direction, and the ax1'-axis direction and has the oblique angle α, are set in the oblique ratio a memory 211, the oblique ratio b memory 212, and the oblique ratio c memory 213 as the oblique ratio a, oblique ratio b, and the oblique ratio c respectively, with respect to the ax1'-axis direction and the ax2-axis direction as the axis directions of the initial program orthogonal coordinate system (the program orthogonal coordinate system A) and the ax1-axis direction and the ax2-axis direction as the feed shaft directions being driven actually, by the oblique angle setting means 206. For example, if the right triangle has the oblique angle α of 60°, the ratios of a:3, b:1, and c:2 are set.

Then, if the program orthogonal coordinate system consisting of the ax1'-axis direction and the ax2-axis direction (program orthogonal coordinate system A) is selected by the coordinate system selecting means 204, the oblique reference shaft is the feed shaft Ax2 (which coincides with the ax2-axis direction of the program orthogonal coordinate system). Therefore, in response to the program command in the ax1'-axis direction (an amount of movement a), the feed shaft Ax1 is moved by the ratio c, which responds to the program command in the ax1'-axis direction, and also the feed shaft Ax2 is moved by the ratio b, which responds to the program command in the ax1'-axis direction, simultaneously with the movement of the feed shaft Ax1. Also, when this coordinate system is selected, the feed shaft Ax1 is not moved in response to the program command only in the ax2-axis direction but merely the feed shaft Ax2 is moved by an amount of movement being commanded by the program.

Also, if the program orthogonal coordinate system consisting of the ax1-axis direction and the ax2'-axis direction (program orthogonal coordinate system B) is selected by the coordinate system selecting means 204, the oblique reference shaft is the feed shaft Ax1 (which coincides with the ax1-axis direction of the program orthogonal coordinate system). Therefore, in response to the program command in the ax2'-axis direction (an amount of movement a), the feed shaft Ax1 is moved by the ratio c, which responds to the program command in the ax2'-axis direction, and also the feed shaft Ax2 is moved by the ratio b, which responds to the program command in the ax2'-axis direction, simultaneously with the movement of the feed shaft Ax1. Also, when this coordinate system is selected, the feed shaft Ax2 is not moved in response to the program command only in the ax1-axis direction but merely the feed shaft Ax1 is moved by an amount of movement being commanded by the program.

In other words, this means the fact that, if three data of the oblique ratio a, the oblique ratio b, and the oblique ratio c are provided and also any one of the shaft being set by the oblique shaft 1 counter 221 and the shaft being set by the oblique shaft 2 counter 222 is switched into the oblique reference shaft, it is possible to handle easily the control of the program orthogonal coordinate system A and the control of the program orthogonal coordinate system B.

Figure 4:
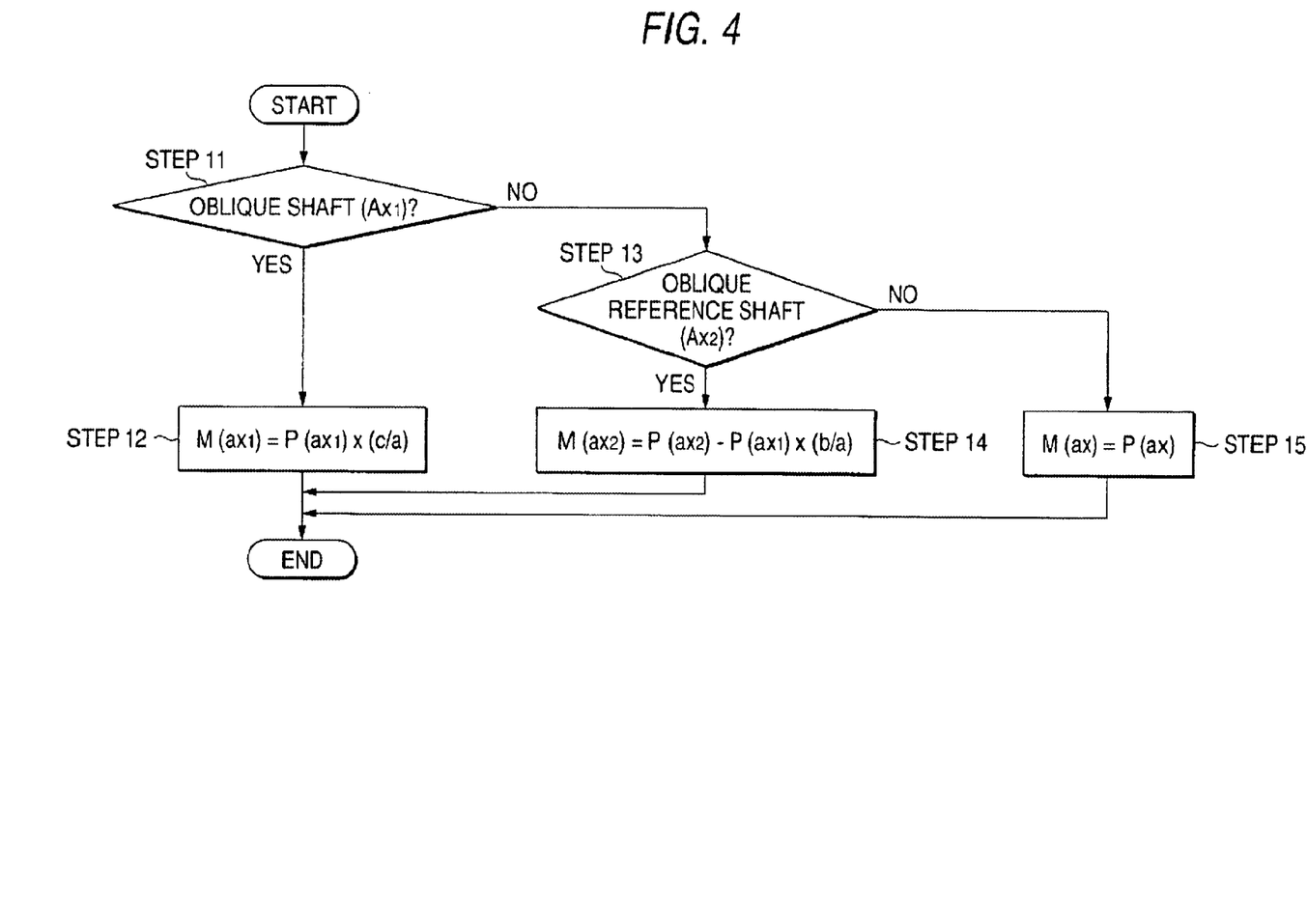
FIG. 4 is a flowchart explaining an operation of a command value converting portion in the numerical control system according to the first embodiment of the present invention (when a program orthogonal coordinate system A is selected).
Figure 5:
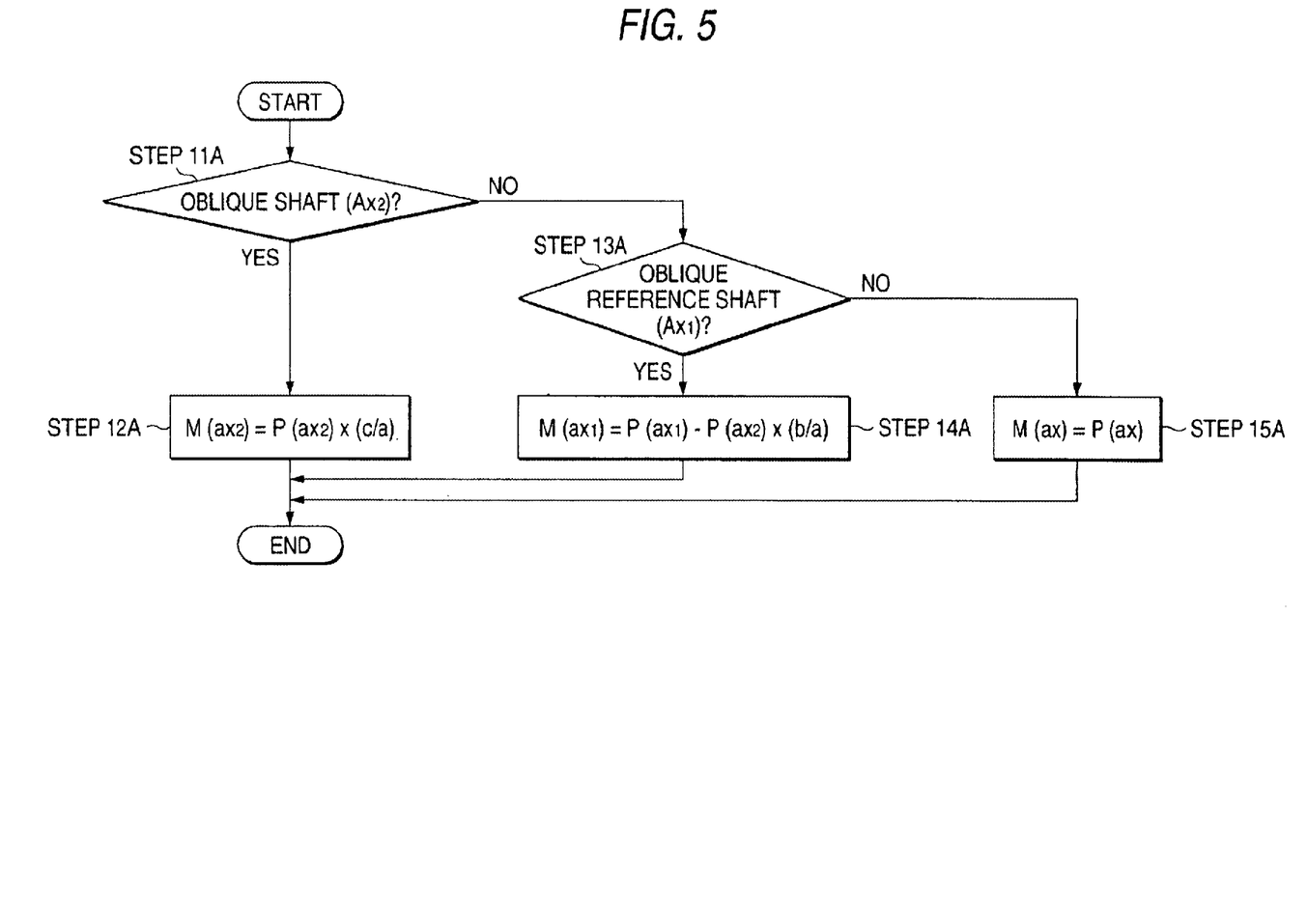
FIG. 5 is a flowchart explaining an operation of the command value converting portion in the numerical control system according to the first embodiment of the present invention (when a program orthogonal coordinate system B is selected).

FIG. 4 and FIG. 5 are flowcharts showing examples of the process of the command value converting portion 203 in the NC system. FIG. 4 shows an example of the process executed when the program orthogonal coordinate system A is selected, and FIG. 5 shows an example of the process executed when the program orthogonal coordinate system B is selected.

Also, an amount of movement (command value) of each axis on the program orthogonal coordinate system, which is provided as the input of the process, is indicated by P(axn). That is, P(ax1) indicates the program command value in the ax1'-axis direction (when the program orthogonal coordinate system A is selected) or in the ax1-axis direction (when the program orthogonal coordinate system B is selected), and P(ax2) indicates the program command value in the ax2-axis direction (when the program orthogonal coordinate system A is selected) or in the ax2'-axis direction (when the program orthogonal coordinate system B is selected).

Also, the real axis command value being output by the process is indicated by M(axn). That is, M(ax1) indicates the real axis command value in the ax1-axis direction (the moving direction of the feed shaft Ax1 in FIG. 1), and M(ax2) indicates the real axis command value in the ax2-axis direction (the moving direction of the feed shaft Ax2 in FIG. 1).

Also, the control shaft numbers of the oblique shaft 1 (the feed shaft Ax1 in FIG. 1) and the oblique shaft 2 (the feed shaft Ax2 in FIG. 1), which are constructed to incline mutually, are stored in the oblique shaft 1 counter 221 and the oblique shaft 2 counter 222 by the oblique shaft setting means 207. At this time, if the initial coordinate system is not changed by the initial coordinate system setting means 208, the program orthogonal coordinate system A that is given as the default value is selected as the initial coordinate system in the present embodiment.

In FIG. 4 (an example of the process in the command value converting portion when the program orthogonal coordinate system A, in which the ax1'-axis does not coincide with the axis direction of the feed shaft Ax1 of the actual machine but the ax2-axis coincides with the feed shaft Ax2 of the actual machine, is selected), it is decided by the oblique shaft 1 counter 221 and the reference shaft counter 231 in Step 11 whether or not the shaft is the oblique shaft (Ax1). If the shaft is the oblique shaft (Ax1), the real axis command value M(ax1) is calculated by the equation given in FIG. 4 based on the orthogonal coordinate system command value P(ax1) of the oblique shaft, the oblique ratio a, and the oblique ratio c, i.e., $M(ax1)=P(ax1)\times(c/a)$ in Step 12. If the shaft is not the oblique shaft (Ax1) in Step 11, it is decided by the oblique shaft 2 counter 222 and the reference shaft counter 231 in Step 13 whether or not the shaft is the oblique reference shaft (Ax2). If the shaft is the oblique reference shaft (Ax2), the real axis command value M(ax2) is calculated by the equation given in FIG. 4 based on the orthogonal coordinate system command value P(ax2) of the oblique reference shaft, the orthogonal coordinate system command value P(ax1) of the oblique shaft (Ax1), the oblique ratio a, and the oblique ratio b, i.e., M(ax2)=P(ax2)−P(ax1)×(b/a) in Step 14. If the shaft is not the oblique reference shaft (Ax2) in Step 13, the shaft is treated as the normal orthogonal shaft and also the orthogonal coordinate system command value P(ax) is set as the real axis command value M(ax) (Step 15).

Also, in FIG. 5 (an example of the process in the command value converting portion when the program orthogonal coordinate system B, in which the ax2'-axis does not coincide with the axis direction of the feed shaft Ax2 of the actual machine but the ax1-axis coincides with the feed shaft Ax1 of the actual machine, is selected), it is decided by the oblique shaft 2 counter 222 and the reference shaft counter 231 in Step 11A whether or not the shaft is the oblique shaft (Ax2). If the shaft is the oblique shaft (Ax2), the real axis command value M(ax2) is calculated by the equation given in FIG. 5 based on the orthogonal coordinate system command value P(ax2) of the oblique shaft, the oblique ratio a, and the oblique ratio c, i.e., M(ax2)=P(ax2)×(c/a) in Step 12A. If the shaft is not the oblique shaft (Ax2) in Step 1A, it is decided by the oblique shaft 1 counter 221 and the reference shaft counter 231 in Step 13A whether or not the shaft is the oblique reference shaft (Ax1). If the shaft is the oblique reference shaft (Ax1), the real axis command value M(ax1) is calculated by the equation given in FIG. 4 based on the orthogonal coordinate system command value P(ax1) of the oblique reference shaft, the orthogonal coordinate system command value P(ax2) of the oblique shaft (Ax2), the oblique ratio a, and the oblique ratio b, i.e., M(ax1)=P(ax1)−P(ax2)×(b/a) in Step 14A. If the shaft is not the oblique reference shaft (Ax1) in Step 13A, the shaft is treated as the normal orthogonal shaft and also the orthogonal coordinate system command value P(ax) is set as the real axis command value M(ax) (Step 15A).

Figure 6:
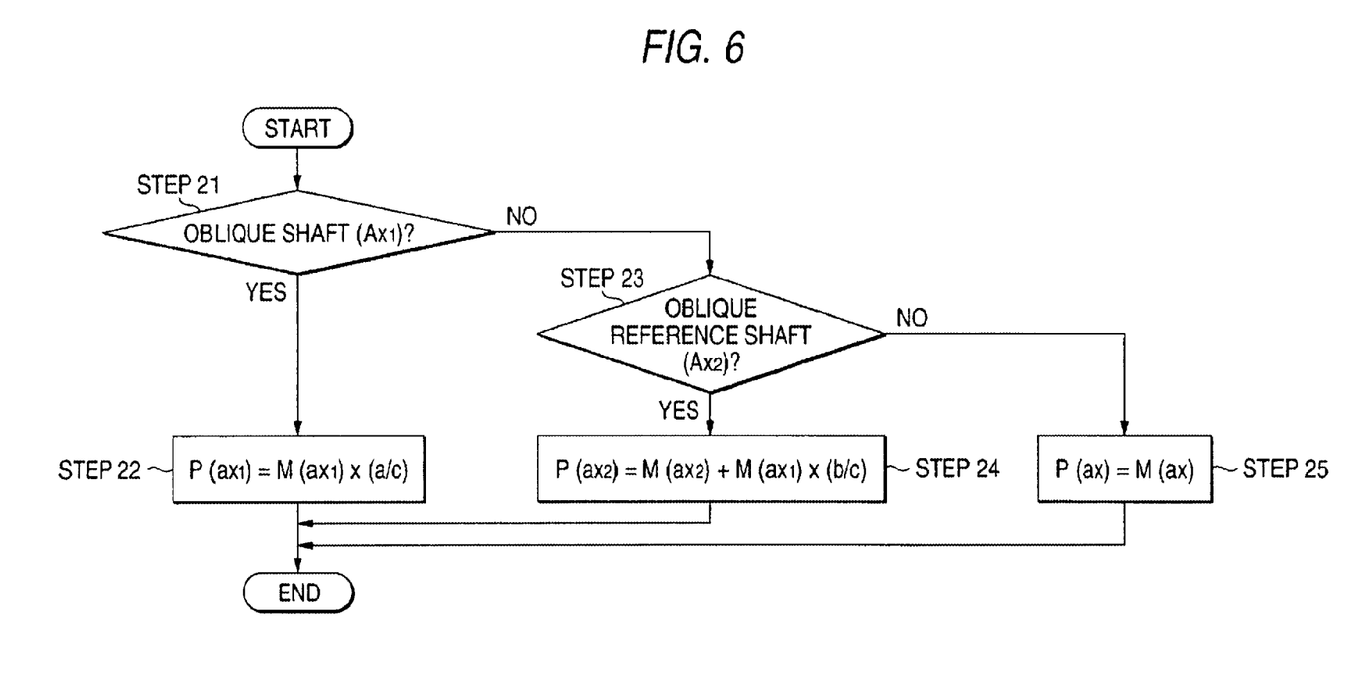
FIG. 6 is a flowchart explaining an operation of a coordinate system reconstruction processing portion in the numerical control system according to the first embodiment of the present invention (when the coordinate system is changed from the program orthogonal coordinate system B to the program orthogonal coordinate system A).
Figure 7:
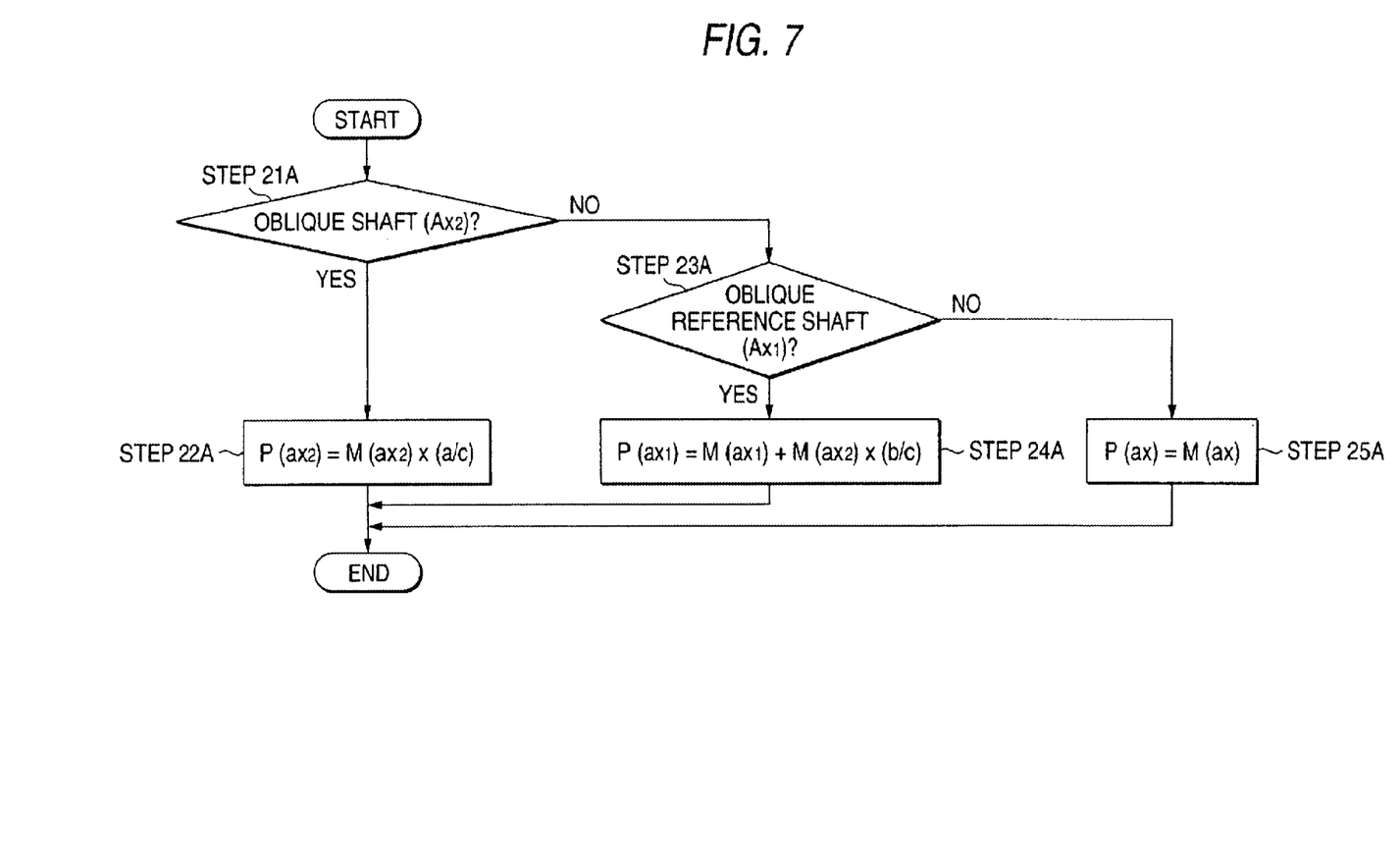
FIG. 7 is a flowchart explaining an operation of the coordinate system reconstruction processing portion in the numerical control system according to the first embodiment of the present invention (when the coordinate system is changed from the program orthogonal coordinate system A to the program orthogonal coordinate system B).

FIG. 6 and FIG. 7 are flowcharts showing examples of the process in the coordinate system reconstruction processing portion 205 that executes the computing process again to get the current position on the newly selected orthogonal coordinate system from the real axis command value when another orthogonal coordinate system is selected by the coordinate system selecting means 204. FIG. 6 shows an example of the process when the program orthogonal coordinate system A is selected in place of the program orthogonal coordinate system B, and FIG. 7 shows an example of the process when the program orthogonal coordinate system B is selected in place of the program orthogonal coordinate system A.

In FIGS. 6 and 7, the real axis command value on each shaft, that is given as the input of the process, is denoted by M(axn). That is, M(ax1) denotes the real axis command value in the ax1-axis direction (the moving direction of the feed shaft Ax1 in FIG. 1), and M(ax2) denotes the real axis command value in the ax2-axis direction (the moving direction of the feed shaft Ax2 in FIG. 1).

Also, the orthogonal coordinate system command value that is output by the process is denoted by P(axn). That is, P(ax1) denotes the program command value in the ax1'-axis direction (when the program orthogonal coordinate system A is selected) or the ax1-axis direction (when the program orthogonal coordinate system B is selected), and P(ax2) denotes the program command value in the ax2-axis direction (when the program orthogonal coordinate system A is selected) or the ax2'-axis direction (when the program orthogonal coordinate system B is selected).

Also, the control shaft numbers of the oblique shaft 1 (the feed shaft Ax1 in FIG. 1) and the oblique shaft 2 (the feed shaft Ax2 in FIG. 1), which are constructed to incline mutually, are stored in the oblique shaft 1 counter 221 and the oblique shaft 2 counter 222 by the oblique shaft setting means 207.

In FIG. 6 (an example of the process when the program orthogonal coordinate system A is selected instead of the program orthogonal coordinate system B), it is decided by the oblique shaft 1 counter 221 and the reference shaft counter 231 in Step 21 whether or not the shaft is the oblique shaft (Ax1). If the shaft is the oblique shaft (Ax1), the orthogonal coordinate system command value P(ax1) is calculated by the equation given in FIG 6 based on the real axis command value M(ax1) of the oblique shaft, the oblique ratio a, and the oblique ratio c, i.e., P(ax1)=M(ax1)×(a/c) in Step 22. If the shaft is not the oblique shaft (Ax1) in Step 21, it is decided by the oblique shaft 2 counter 222 and the reference shaft counter 231 in Step 23 whether or not the shaft is the oblique reference shaft (Ax2) If the shaft is the oblique reference shaft (Ax2), the orthogonal coordinate system command value P(ax2) is calculated by the equation given in FIG. 6 based on the real axis command value M(ax2) of the oblique reference shaft, the real axis command value M(ax1) of the oblique shaft (Ax1), the oblique ratio b, and the oblique ratio c, i.e., P(ax2)=M(ax2)+M(ax1)×(b/c) in Step 24. If the shaft is not the oblique reference shaft (Ax2) in Step 23, the shaft is treated as the normal orthogonal shaft and also the real axis command value M(ax) is set as the orthogonal coordinate system command value P(ax) (Step 25).

Also, in FIG. 7 (an example of the process when the program orthogonal coordinate system B is selected in place of the program orthogonal coordinate system A), it is decided by the oblique shaft 2 counter 222 and the reference shaft counter 231 in Step 21A whether or not the shaft is the oblique shaft (Ax2). If the shaft is the oblique shaft (Ax2), the orthogonal coordinate system command value P(ax2) is calculated by the equation given in FIG. 7 based on the real axis command value M(ax2) of the oblique shaft, the oblique ratio a, and the oblique ratio c, i.e., P(ax2)=M(ax2)×(a/c) in Step 22A. If the shaft is not the oblique shaft (Ax2) in Step 21A, it is decided by the oblique shaft 1 counter 221 and the reference shaft counter 231 in Step 23A whether or not the shaft is the oblique reference shaft (Ax1). If the shaft is the oblique reference shaft (Ax1), the orthogonal coordinate system command value P(ax1) is calculated by the equation given in FIG. 7 based on the real axis command value M(ax1) of the oblique reference shaft, the real axis command value M(ax2) of the oblique shaft (Ax2), the oblique ratio b, and the oblique ratio c, i.e., P(ax1)=M(ax1)+M(ax2)×(b/c) in Step 24A. If the shaft is not the oblique reference shaft (Ax1) in Step 23A, the shaft is treated as the normal orthogonal shaft and also the real axis command value M(ax) is set as the orthogonal coordinate system command value P(ax) (Step 25A).

FIG. 8 is a schematic configurative view of the NC lathe that is controlled by the NC system according to the present invention. In FIG. 8, 101 is a turret, 102 is a work, and 103 is a chuck for holding the work. Also, 111 is a tool-1 for executing the turning process or the tapping process, and 112 is a tool-2 for executing the milling process. These tools are fitted to the turret 101.

The turret 101 is driven by the Xm axis (which corresponds to the feed shaft Ax1 in FIG. 1, and the feed direction coincides with the ax1-axis direction of the program orthogonal coordinate system B), the Ym axis (which corresponds to the feed shaft Ax2 in FIG. 1, and the feed direction coincides with the ax2-axis direction of the program orthogonal coordinate system A), and the Zm axis. The Xm axis is arranged to be driven at an inclination to the Ym axis by an angle α and the Ym axis is arranged to be driven in the horizontal direction. Also, the Zm axis is arranged to be driven in the horizontal direction and the work longitudinal direction. The work 102 is rotated by the spindle, and is processed by the tool being fitted to the turret 101 by driving the Xm axis, the Ym axis, and the Zm axis.

In the case of the example in FIG. 8, since the Xm axis and the Ym axis are inclined mutually by the oblique shaft setting means 207, such Xm axis and such Ym axis are set in the oblique shaft counters 221, 222 as the oblique shafts 1, 2.

When the oblique shafts 1, 2 are set in the oblique shaft counters 221, 222 in this manner, the program orthogonal coordinate system A (ax1'–ax2) in which the oblique shaft being set in the oblique shaft 2 counter 222 serves as the oblique reference shaft and the Xm axis does not coincide with the feed shaft direction is set as the default values, as described above, in the present embodiment. Therefore, in the case that the normal turning process using the turning tool as the tool-1 111 is carried out prior to other processes, the Xm axis is set as the oblique reference shaft, i.e., the program orthogonal coordinate system B (ax1–ax2') is set by the initial coordinate system setting means 208 since such process must be carried out by moving first the Xm axis only and then executing the interpolation between the Xm axis and the Zm axis.

Also, in the case that the plane process (the process for forming the flat portion on the outer peripheral portion of the cylindrical work) using the milling tool as the tool-2 112 is carried out prior to other processes, the process must be carried out by moving the Ym axis only. Thus, the program orthogonal coordinate system A (ax1'–ax2) as the default values is still maintained without the use of the initial coordinate system setting means 208.

In addition, the oblique ratios a, b, c that respond to the oblique angle α between the Xm axis and the Ym axis are set in the oblique ratio a memory 211, the oblique ratio b memory 212, and the oblique ratio c memory 213 by the oblique angle setting means 206 respectively. Accordingly, the program orthogonal coordinate system B constructed by ax1–ax2', in which the Xm-axis direction coincides with the ax1-axis direction on the program orthogonal coordinate system, is selected and at the same time the program orthogonal coordinate system A constructed by ax1'–ax2, in which the Ym-axis direction coincides with the ax2-axis direction on the program orthogonal coordinate system, is built up.

Figure 9:
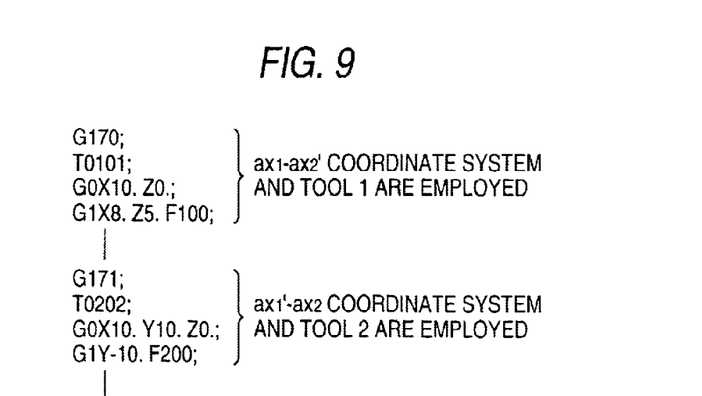
FIG. 9 is a view showing a program example of the NC machine tool that is controlled by the numerical control system according to the first embodiment of the present invention.

FIG. 9 shows an example of the NC program of the NC lathe shown in FIG. 8, wherein the program orthogonal coordinate system A is selected by the G171 command and the program orthogonal coordinate system B is selected by the G170 command.

In the case of this example of the NC program, first the program orthogonal coordinate system B is selected by the G170 command and the tool-1 111 (the turning tool for the normal turning process) is selected by T0101. Then, only the Xm-axis is moved by 10 mm based on the G0X10.Z0 command as the quick traverse and then the Xm-axis and the Zm-axis are moved simultaneously by 8 mm and 5 mm based on the G1X8.Z5. F100 command as the feed of F100, whereby the turning process is carried out on the normal ZX-plane on the Xm-axis and the Zm-axis.

In this case, if the tapping tool is employed as the tool-1 111, this tapping tool is rotated by a motor (not shown) built in the turret 101, and only the Xm-axis is moved, the tapping process can be carried out.

Then, the program orthogonal coordinate system A is selected by the G171 command and also the tool-2 (milling tool) 112 is selected by the T0202 command. Then, the Xm-axis and the Zm-axis are moved simultaneously by 10 mm based on the G0X10.Y10.Z0 command respectively as the quick traverse. Then, only the Ym-axis is moved by −10 nun based on the G1Y-10.F200 command as the feed of F200, whereby the plane process (the process for forming the flat portion on the outer peripheral portion of the cylindrical work) can be carried out. At this time, if the Zm-axis command is issued, the process on the YZ plane can be carried out by the feeds in the Ym-axis direction and the Zm-axis direction.

Also, in the example of the NC program shown in FIG. 9, the G170 command to select the program orthogonal coordinate system B is issued to the first block. This is because FIG. 9 is given by extracting the portion (the block for switching the coordinate system from the program orthogonal coordinate system A to the program orthogonal coordinate system B, the block for switching the coordinate system from the program orthogonal coordinate system B to the program orthogonal coordinate system A, etc.) in the middle of the NC program. As described above, since any one of the program orthogonal coordinate system A being set as the default values and the program orthogonal coordinate system B being set by initial coordinate system setting means 208 is set as the initial coordinate in starting the NC system, the G170 or G171 command is not needed in the first block of the NC program.

As mentioned above, in the NC lathe shown in FIG. 9, if the normal turning process is carried out by employing the tool-1 (turning tool) 111, the X command acts as the command in the ax1 axis by selecting the G170 plane and thus only the Xm axis can be fed by the X command. Therefore, the turning process using the interpolation between the Xm axis and the Ym axis can be carried out by the command on the orthogonal coordinate system independent of the movement of the Ym axis. At this time, the tool can be fed in the ax2'-axis direction by issuing the Y command.

Also, if the milling process is carried out in the Ym-axis direction by using the tool-2 (milling tool) 112, the Y command acts as the command in the ax2-axis direction by selecting the G171 plane and thus only the Ym axis can be fed by the Y command. Therefore, the process in the Ym-axis direction can be carried out by the command on the orthogonal coordinate system independent of the movement of the Xm axis. At this time, the tool can be fed in the Xp2-axis direction by issuing the X command.

Therefore, in the case that the NC system of the present invention is employed as the NC lathe shown in FIG. 9, another process can be carried out without the change of the turret position by selecting the coordinate system that is suited for the processing pattern if the turret is fitted to one turret position while changing the cutting direction of the tool. As a result, the indexing time of the turret can be shortened and thus the production efficiency can be improved.

Second Embodiment

In the first embodiment, the means for storing the ratios a, b, c of respective sides of the triangle having the oblique angle α, which are input from the keyboard, or the like, into the oblique ratio memories 211 to 213 is explained as the oblique angle setting means 206. It is needless to say that the oblique angle setting means may be constructed to calculate the ratios a, b, c of respective sides of the triangle based on the oblique angle α that is input from the keyboard, or the like and store the calculated ratios a, b, c of respective sides of the triangle into the oblique ratio memories 211 to 213.

As described above, according to the present invention, two shafts whose moving directions do not intersect orthogonally with each other are set, then any one shaft of two shafts as an oblique reference shaft is set, then information based on an angle between two shafts whose moving directions do not intersect orthogonally with each other are set, then a first program orthogonal coordinate system constructed such that a moving direction of the oblique reference shaft coincides with a command axis direction of the program orthogonal coordinate system and a second program orthogonal coordinate system constructed such that a moving direction of another shaft other than the oblique reference shaft coincides with a command axis direction of the program orthogonal coordinate system are set, and then any one of the first program orthogonal coordinate system and the second program orthogonal coordinate system is selected. Therefore, like the example shown in FIG. 8, in the case that the tapping process is to be carried out by the tool-1 (tapping tool) fitted in the Xm-axis direction, such tapping process can be implemented by moving the tool-1 in the Xm-axis direction only if the program orthogonal coordinate system in which the axis direction of the X command coincides with the moving direction of the Xm axis is selected. Also, in the case that the plane process is to be carried out by the tool-2 (milling tool) fitted in the Ym-axis direction, such plane process can be implemented by moving the tool-2 in the Ym-axis direction only if the program orthogonal coordinate system in which the axis direction of the Y command coincides with the moving direction of the Ym axis is selected.

Accordingly, the optimum tool can be selected to meet to the process pattern, and the process can be executed by the optimum shaft feed, and thus the processing precision can be improved.

Also, if the program orthogonal coordinate system is switched, the movement in the Xm-axis only or the movement in the Ym-axis only can be implemented by the Xm-axis or Ym-axis moving command only. Therefore, if the feed is required along the actual feed shaft direction, the complicated program command is not needed, and thus there can be achieved the effect that the program length can be saved.

Also, according to the present invention, the initial orthogonal coordinate system can be set arbitrarily by the operator. Therefore, the program orthogonal coordinate system can be selected without the issuance of the coordinate system selecting command to conform to the tool that is selected initially according to the process pattern, and thus there can be achieved the effect that the program length can be saved.

Also, according to the present invention, the length ratio of three sides of a triangle is set directly based on an angle between two shafts whose moving directions do not intersect orthogonally with each other. Therefore, not only the values of the oblique ratios can be set easily based on the fitting dimension of the machine, but also the command value on the orthogonal coordinate system can be converted into the command value on the actual shaft by four operations only without the complicated computation such as the trigonometric function. As a result, the computing load can be reduced and thus there can be achieved the effect that the performance of the NC system can be improved.

Also, according to the present invention, a length ratio of three sides of a triangle is calculated based on an angle between two input shafts whose moving directions do not intersect orthogonally with each other, and the calculated length ratio of three sides of the triangle is set. Therefore, it is required of the operator to set merely the oblique angle, and thus the time and labor in setting can be omitted.

Also, the calculated length ratio of three sides of the triangle can be set in the inside of the NC system. Therefore, the command value on the orthogonal coordinate system can be converted into the command value on the actual shaft by the four operations only. As a result, the computing load can be reduced and thus there can be achieved the effect that the performance of the NC system can be improved.

Industrial applicability

As described above, the numerical control method and system according to the present invention is suitable for the control of the machine tool having the feed shafts that do not intersect orthogonally with each other, etc.

What is claimed is:

1. A numerical control method of controlling a machine tool having at least two feed shafts, moving directions of which do not intersect orthogonally with each other, by issuing commands on a program orthogonal coordinate system, comprising:

a step of setting two shafts whose moving directions do not intersect orthogonally with each other, setting any one shaft of two shafts as an oblique reference shaft, setting information based on an angle between two shafts whose moving directions do not intersect orthogonally with each other, and setting a first program orthogonal coordinate system constructed such that a moving direction of the oblique reference shaft coincides with a command axis direction of the program orthogonal coordinate system and a second program orthogonal coordinate system constructed such that a moving direction of another shaft other than the oblique reference shaft coincides with a command axis direction of the program orthogonal coordinate system; and a step of selecting any one of the first program orthogonal coordinate system and the second program orthogonal coordinate system.

2. A numerical control system for controlling a machine tool having at least two feed shafts, moving directions of which do not intersect orthogonally with each other, by issuing commands on a program orthogonal coordinate system, comprising:

first setting means for setting two shafts whose moving directions do not intersect orthogonally with each other, and setting any one shaft of two shafts as an oblique reference shaft;

oblique angle setting means for setting information based on an angle between two shafts whose moving directions do not intersect orthogonally with each other; and coordinate system selecting means for selecting any one of a first program orthogonal coordinate system constructed such that a moving direction of the oblique reference shaft coincides with a command axis direction of the program orthogonal coordinate system and a second program orthogonal coordinate system constructed such that a moving direction of another shaft other than the oblique reference shaft coincides with a command axis direction of the program orthogonal coordinate system, both being set by the first setting means and the oblique angle setting means.

3. A numerical control system according to claim 2, further comprising:
   initial coordinate system setting means for selecting any one of the first program orthogonal coordinate system and the second program orthogonal coordinate system as the program orthogonal coordinate system in an initial state.

4. A numerical control system according to claim 2 or 3, wherein the oblique angle setting means sets directly a length ratio of three sides of a triangle based on an angle between two shafts whose moving directions do not intersect orthogonally with each other.

5. A numerical control system according to claim 2 or 3, wherein the oblique angle setting means calculates a length ratio of three sides of a triangle based on an angle between two input shafts whose moving directions do not intersect orthogonally with each other and then sets a calculated length ratio of three sides of the triangle.

6. A numerical control system for controlling a machine tool having at least two feed shafts, moving directions of which do not intersect orthogonally with each other, by issuing commands on a program orthogonal coordinate system, comprising:
   a first setting part for setting two shafts whose moving directions do not intersect orthogonally with each other, and setting any one shaft of two shafts as an oblique reference shaft;
   an oblique angle setting part for setting information based on an angle between two shafts whose moving directions do not intersect orthogonally with each other; and
   a coordinate system selecting part for selecting any one of a first program orthogonal coordinate system constructed such that a moving direction of the oblique reference shaft coincides with a command axis direction of the program orthogonal coordinate system and a second program orthogonal coordinate system constructed such that a moving direction of another shaft other than the oblique reference shaft coincides with a command axis direction of the program orthogonal coordinate system, both being set by the first setting part and the oblique angle setting part.

7. A numerical control system according to claim 6, further comprising:
   an initial coordinate system setting part for selecting any one of the first program orthogonal coordinate system and the second program orthogonal coordinate system as the program orthogonal coordinate system in an initial state.

8. A numerical control system according to claim 6 or 7, wherein the oblique angle setting part sets directly a length ration of three sides of a triangle based on an angle between two shafts whose moving directions do not intersect orthogonally with each other.

9. A numerical control system according to claim 6 or 7, wherein the oblique angle setting part calculates a length ratio of three sides of a triangle based on an angle between two input shafts whose moving directions do not intersect orthogonally with each other and then sets a calculated length ration of three sides of the triangle.

* * * * *